Jan. 25, 1966 H. STOPPER ETAL 3,231,754

TRIGGER CIRCUIT WITH ELECTRONIC SWITCH MEANS

Filed May 8, 1961 2 Sheets-Sheet 1

INVENTORS
Herbert Stopper &
Erwin Jauch
BY Spencer & Kaye
ATTORNEYS

INVENTORS
Herbert Stopper &
Erwin Jauch
BY Spencer & Kaye
ATTORNEYS

United States Patent Office 3,231,754

Patented Jan. 25, 1966

3,231,754
TRIGGER CIRCUIT WITH ELECTRONIC SWITCH MEANS

Herbert Stopper, Konstanz, and Erwin Jauch, Allensbach (Bodensee), Germany, assignors to Telefunken Patent-verwertungs-G.m.b.H., Ulm (Danube), Germany Filed May 8, 1961, Ser. No. 108,354
Claims priority, application Germany, May 12, 1960, T 18,363
4 Claims. (Cl. 307—88.5)

The present invention relates to trigger circuits.

More particularly, the present invention relates to bistable trigger circuits, i.e., trigger circuits having two conditions of conductivity, and particularly to those controlled by separately generated trigger pluses fed to separate trigger inputs, in particular to the bases of transistors having cross-connected feedback. In one mode of operation, these separate inputs are controlled by two separately acting control potentials, one from each of two lines. Such trigger circuits may be referred to as being of the reset-set type (RS-flip-flop). A trigger circuit of the time-delay type (D-flip-flop) is one which is brought to "O" conductivity condition by an input signal "O" and to "L" conductivity condition by the input value "L," but only after a certain time delay.

It is known to determine the conditions "O" or "L" by control voltages, and to derive the trigger pulses from a separate source of timing pulses in such a way that, after the input of the control information "O" or "L," the next following timing pulse appropriately actuates the trigger circuit. It is further known to apply the timing pulses to two condenser, each of which is connected with one trigger input point, and also with a respective control voltage line, the control voltage, depending upon the information it contains, permitting the transmission of a trigger voltage or preventing this transmission by performing a gate function.

The present invention involves a bistable trigger circuit employing an input control in such a way that, under the action of the control voltages, trigger pulses may be applied to the one or the other trigger circuit input. According to the invention, especially when using the above-mentioned capacitative couplings for the trigger pulses, a control voltage is used which is effective at the one trigger input and also varies, for example by way of a switch means, the control effect of a control voltage independently applied at the other trigger input, for example a constant bias voltage. In particular, the first-named control voltage may control a switch which in one position renders trigger pulses at the associated input ineffective.

In a preferred embodiment, the switch is a switching transistor whose base is controlled by the variable control voltage applied at an input condenser at the one trigger input. The emitter-collector circuit of this switching transistor is connected (a) between the coupling condenser of the other input and the other trigger input and (b) with an operating potential making shunting of the control pulses possible.

For computer or logic circuits having controlled bistable trigger circuits, the present invention provides the following: when reset-set type trigger circuits and time-delay type trigger circuits are connected to each other, trigger circuits of the same basic construction are used, the trigger circuits of the time-delay type being arranged in the manner described above. A main advantage of this is that the sequence control of the trigger circuit can be effected, via a path for applying the one control voltage, with a pulse frequency undiminished with respect to the reset-set type trigger circuit, so that the time-delay type trigger circuit adapts itself uniformly in the circuit.

Additional objects and advantages of the present invention will become apparent upon consideration of the following description when taken in conjunction with the accompanying drawings in which.

Figure 1:
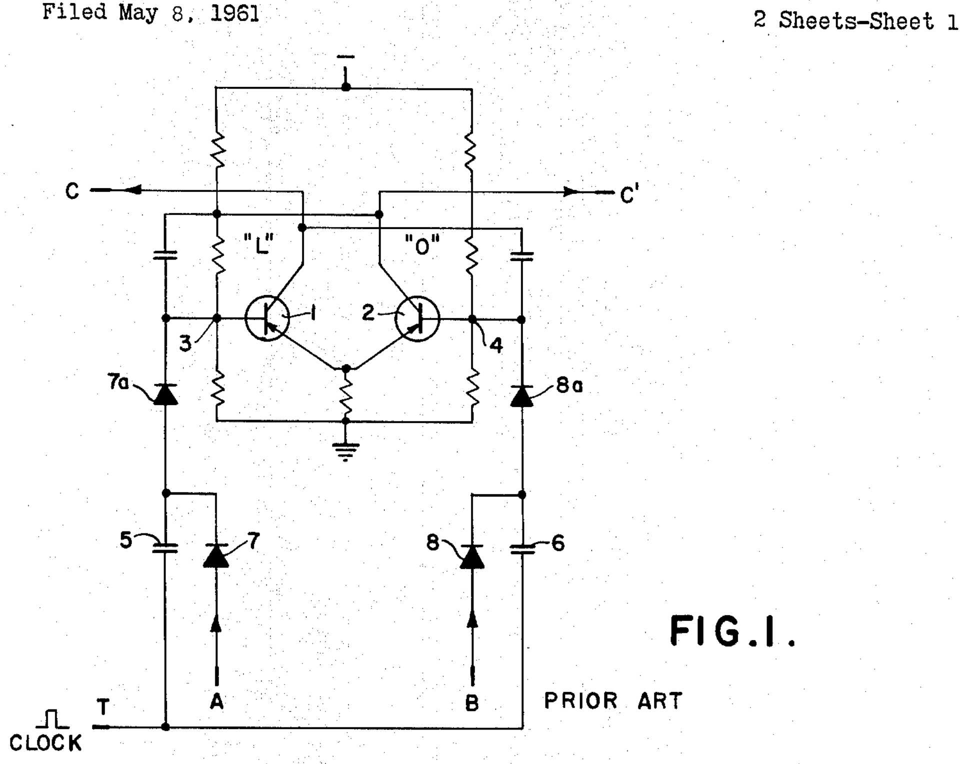
FIGURE 1 is a schematic diagram of a reset-set type trigger circuit, this circuit per se being known.

In FIGURE 1, two p-n-p transistors 1 and 2 are connected in a conventional bistable circuit employing criss-cross feedback between the transistors, so that at any given instant only one transistor is conductive, the other transistor being blocked. The first transistor remains conductive until it is blocked or until the other transistor is rendered conductive by some external drive. This circuit is well known, so that a detailed description thereof is unnecessary.

The base connections 3 and 4 of the two transistors are the trigger input points, and the switching of the bistable circuit is accomplished in the present case by pulsing the base of the conductive transistor with a positive pulse, to cut it off. The trigger pulses are coupled to the base inputs 3 and 4 by condensers 5 and 6 through which rectangular timing pulses are fed from a line T. To the output of the condenser 5, there is connected a charging diode 7 coupled to a control potential A; and the output of the condenser 6 is connected to a charging diode 8 coupled to a control potential B, it being understood that, if desired, resistors can be used in place of these diodes. If a positive potential is applied at one of the control points A or B, the negative flank of the timing pulse causes charging of the condenser, and when the next positive timing pulse flank appears at T, a positive discharge pulse is fed as a trigger to the corresponding trigger input 3 or 4 through a gating diode **7*a* or 8*a*. Conversely, if the control voltage is made negative instead, the feeding of such a trigger pulse through a idode 7*a* or 8*a*** to a transistor base does not take place. Thus, the bistable trigger circuit is controlled in such a manner that when a positive control potential is fed either to control input A or control input B, the other control input necessarily must receive a negative control potential. The trigger pulse thus applied reverses the flip-flop to the state where the other side is conductive, unless it was already in this state. The operation is thus that of a reset-set circuit.

In order to obtain a time-delay type action using the same basic circuit, a line feeding the voltages "O" or "L," respectively, could be coupled to one of the two control inputs A or B, for example, at B whereupon the valuation shown in the figure would then have to read: transistor 2 conducting="O," transistor 1 conducting="L," and the trigger circuit might be set to zero before each recording process. For this purpose, however, one would have to separate the condenser inputs and provide a separate intermediate beat, which entails a cost of time.

Another possibility suggesting itself is to connect an inverter between the two control inputs and to connect a control voltage to one side only. However, the passage of the wave form through the inverter likewise requires time and therefore a prolongation of the timing pulse period would become necessary.

Figure 2:
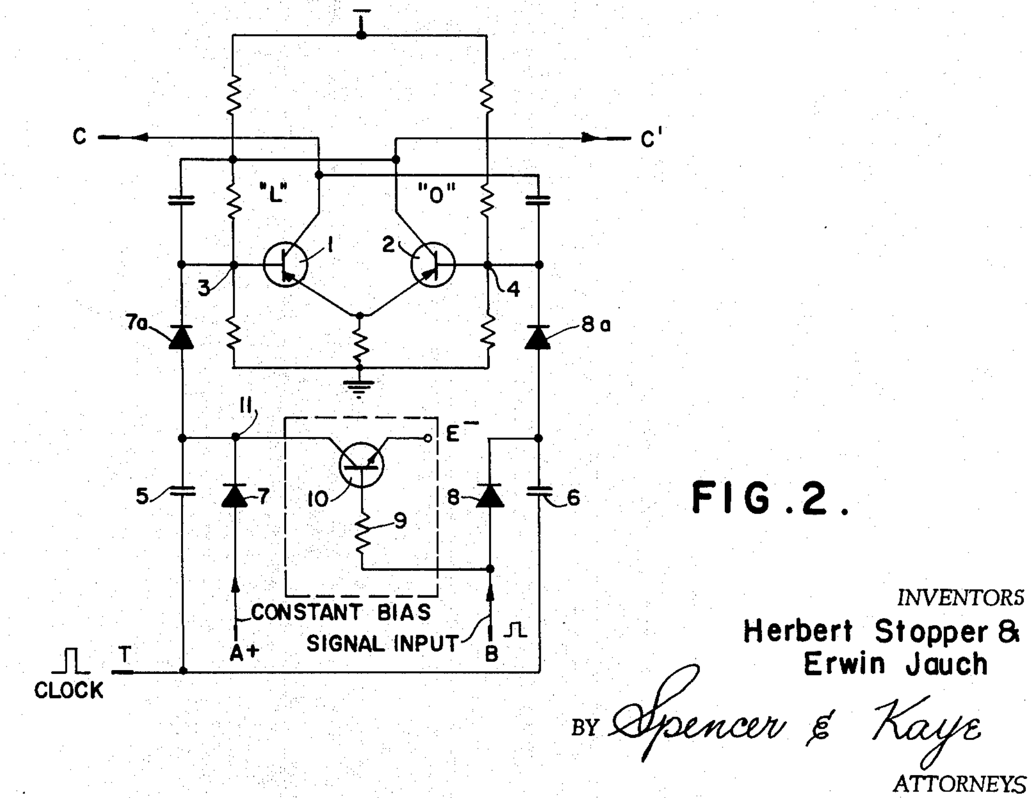
FIGURE 2 is a schematic diagram of the circuit shown in FIGURE 1, but including means for applying the control information to only one input point of the bistable circuit, thereby converting the reset-type trigger circuit of FIGURE 1 into a time-delay type trigger circuit.

This is not the case in the control circuit according to the present invention, which may be seen in FIGURE 2. Like components in this figure have the same reference characters as in FIGURE 1. The control voltage applied at B controls the feeding of a trigger pulse to the trigger input 4 in precisely the same manner already described in connection with FIGURE 1, but it also controls the base of an n-p-n transistor 10 via a resistance 9. To the input A a constant positive bias is applied which is about equal to the positive value (="L") of the control voltage at B. The emitter voltage E for the transistor is adjusted more negative than this positive bias at A, but more positive than the negative voltage at B. The other end of the emitter-collector path is connected at 11 with the input A.

If, now, a negative potential (="O") is applied at point B, the transistor 10 is blocked, and the next following positive timing pulse flank applied at T cuts off the base of the transistor 1 by applying a positive trigger pulse at 3, so that this base is blocked and the flip-flop likewise goes to "O." If, however, a positive potential (="L") is applied at B, the switching path of the transistor 10 becomes conductive and the positive pulse emanating from condenser 5 due to the positive timing pulse flank at T, is shorted out by the transistor 10. With the transistor being connected in the configuration depicted in FIGURE 2, this switching path is formed by the emitter-collector path of the transistor, the base electrode being the control electrode which serves as the input terminal of the switch. Thus, no trigger input to 3 occurs, but transistor 2 is blocked by the positive timing pulse flank, and the flip-flop in this case is likewise reversed again to "L."

As long as a constant positive potential is applied to A, a trigger pulse is produced via condenser 5 by each positive timing pulse flank, but with positive potential at B it is shorted out in the manner indicated, it being noted that if a resistance is used instead of the diode 7, only a partial condenser charging will take place and the residual pulse will be shunted. As an alternative, it is, of course, possible to vary the bias independently applied at A, for example, by making it temporarily negative in order to prevent the reversal of the flip-flop to "O." It may be convenient to provide the transistor switch 10 with steering means, by way of example with a condenser connected to its base, insuring an increased storing effect. Thus in the cases, where it is desired to allow the removal of the control voltage before the occurrence of the active timing pulse flank, an elongated interval therebetween is available.

Figure 3:
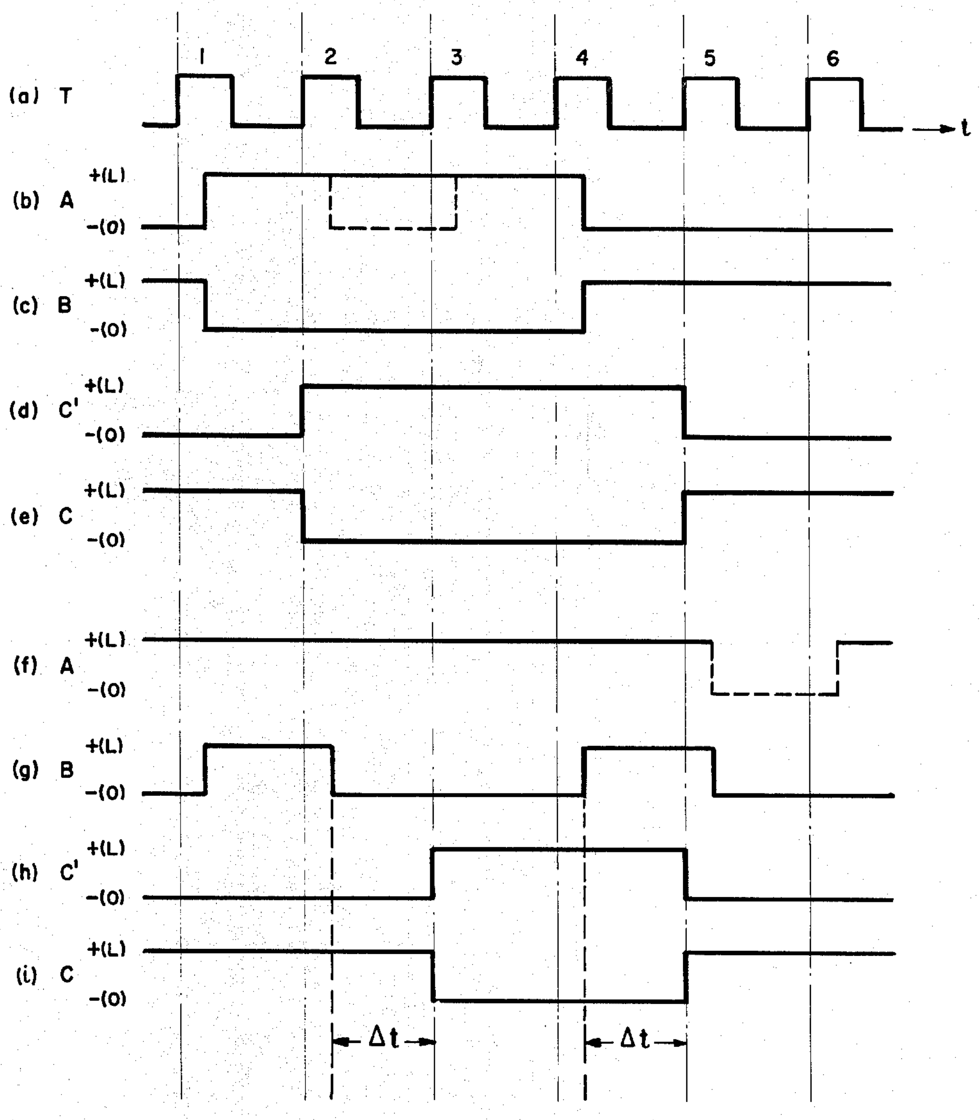
FIGURE 3 shows a series of wave forms illustrating the operation of the circuits shown in FIGURES 1 and 2, with form (*a*) showing positive clock pulses, forms (*b*), (*c*), (*d*) and (*e*) showing the pulses at points A, B, C′ and C, respectively, of FIGURE 1, and forms (*f*), (*g*), (*h*) and (*i*) showing the pulses at points A, B, C′ and C, respectively, of FIGURE 2.

FIGURE 3 shows the wave forms illustrating the operation of the circuits of FIGURES 1 and 2, with the first wave form (*a*) representing six positive clock pulses 1 through 6, the second through fifth wave forms (*b*), (*c*), (*d*) and (*e*) showing the operation of the circuit of FIGURE 1, and the sixth through ninth wave forms (*f*), (*g*), (*h*), and (*i*) showing the operation of the circuit of FIGURE 2.

Considering first the operation of FIGURE 1, the voltages applied to points A and B can be, for example, the mutually complementary voltages of the two outputs of a logical input flip-flop. The voltage A becomes positive during clock pulse 1. During this time, the voltage B has to become or remain negative; after A becomes positive, the following negative flank of pulse 1 charges the condenser 5, and the positive flank of pulse 2 applies, as a discharge pulse, a positive pulse to the base of transistor 1, as a result of which the latter becomes non-conductive and output C becomes negative (=O). The complementary output C′ becomes positive. During the positive clock pulse 4, the voltage B becomes positive and voltage A negative, and the positive flank of clock pulse 5 produces a triggering pulse in transistor 2 which brings the flip-flop into its other condition. The RS-flip-flop will thus always assume a condition dependent upon the flip-flop connected ahead of it, this taking place, due to the clock pulsing, with some time delay which, however, is not substantial.

Also shown, in dashed lines, is what occurs when the voltage A is negative, so that both inputs A, B, are negative during clock pulse 2. The voltage A again becomes positive during clock pulse 3, so that, with the positive flank of clock pulse 4, a positive trigger pulse is applied to transistor 1. But nothing happens because the latter was already non-conductive, the flip-flop already being in the right position. If the voltage at A follows the dashed curve, this will have no effect on the voltages C and C′.

In the circuit of FIGURE 2, the voltage A is shown as a constant positive voltage. Voltage becomes positive during clock pulse 1. The transistor 10 becomes conductive, and while no blocking pulse reaches transistor 1, a blocking pulse does reach transistor 2. Nothing happens, however, because the D-flip-flop is already in the proper position (transistor 2 being non-conductive). Voltage B becomes negative during clock pulse 2. Transistor 10 becomes non-conductive and the following positive flank of clock pulse 3 renders transistor 1 non-conductive, so that the flip-flop assumes its other position in which C becomes negative and C′ positive. The voltage B again becomes positive during clock pulse 4, so that the flip-flop goes back into its previous position. The voltages at C and C′ thus follow the voltages at B, with a time delay indicated by $\Delta t$.

Also shown is what happens, during clock pulses 5 and 6, when, as indicated in dashed lines, the normally constant voltage A is temporarily made negative in order to prevent the reversal of the flip-flop to "O." If, during clock pulse 5, the voltage B becomes negative, the flip-flop does not follow but remains in the same position.

In computer or logic circuits, trigger circuits of various kinds are frequently combined with one another, as known, for example via AND-gates or OR-gates, permitting simultaneous control of such gates by a preceding trigger circuit, as is frequently desirable or necessary. When these trigger circuits are actuated by timing pulses, they should, as far as possible, have the same time constants, so that the response time does not have to be reduced to the rate of the slowest trigger circuit. When combining trigger circuits of the reset-set type having two separately controllable inputs with trigger circuits of the time-delay type, it is advantageous if the trigger circuits of the time-delay type are designed in the above-described manner, the two types of trigger circuits having the same basic construction.

It will be understood that the above description of the present invention is susceptible to various modifications, changes, and adaptions, and the same are intended to be comprehended within the meaning and range of equivalents of the appended claims.

What is claimed is:

1. A circuit arrangement comprising, in combination:

(a) a bistable trigger circuit having first and second inputs;

(b) first and second storage devices connected to said first and second inputs, respectively;

(c) an electronic switch having a switching path and an input terminal, said switching path being connected in series circuit with a source of bias, said switching path also being connected to the junction of said first input of said trigger circuit and said first storage device; and (d) means for applying a control signal to said input terminal of said switch and to the junction of said second input of said second storage device.

2. A circuit arrangement as defined in claim 1 wherein said first and second storage devices comprise first and second condensers, respectively, and wherein said switch, for preventing said first condenser from passing on the stored singal, is controlled, by the control voltage applied to said second condenser, to draw current from said first condenser.

3. A circuit arrangement as defined in claim 2 wherein said switch comprises a transistor having a base, an emitter, and a collector, the emitter-collector path of said transistor being said switching path of said electronic switch and said base being said input terminal of said electronic switch.

4. In combination with a trigger circuit having first and second input gating diodes, a circuit arrangement which comprises:

(a) a first condenser connected to said first gating diode;
(b) a second condenser connected to said second gating diode;
(c) means for applying clock pulses to said first and second condensers;
(d) a first charging diode having one terminal connected to the junction of said first condenser and said first gating diode;
(e) a second charging diode having one terminal connected to the junction of said second condenser and said second gating diode;
(f) means for applying a constant bias to the other terminal of said first charging diode;

(g) a transistor having a base, an emitter and a collector, one end of the emitter-collector path of said transistor also being connected to said junction of said first condenser and said first gating diode and the other end of said emitter-collector path being connected to a potential of a voltage opposite to that applied to said first charging diode by said biasing means; and
(h) means for applying a control voltage to said base of said transistor and also to the other terminal of said second charging diode and hence, via said second charging diode, to the junction of said second condenser and said second gating diode.

References Cited by the Examiner

UNITED STATES PATENTS

| | | | |
|---|---|---|---|
| 2,880,317 | 3/1959 | Vaughan | 328—195 |
| 2,885,663 | 5/1959 | Curtis | 307—88.5 |
| 2,909,675 | 10/1959 | Edson | 307—88.5 |
| 2,941,073 | 6/1960 | Scuitto | 328—194 |
| 3,037,171 | 5/1962 | Cerofolini | 307—88.5 X |
| 3,069,565 | 12/1962 | Van Ness | 307—88.5 |

ARTHUR GAUSS, *Primary Examiner.*

HERMAN KARL SAALBACH, JOHN W. HUCKERT, *Examiners.*